US007505952B1

(12) United States Patent
Engler

(10) Patent No.: US 7,505,952 B1
(45) Date of Patent: Mar. 17, 2009

(54) STATISTICAL INFERENCE OF STATIC ANALYSIS RULES

(75) Inventor: Dawson Richards Engler, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 877 days.

(21) Appl. No.: 10/689,556

(22) Filed: Oct. 20, 2003

(51) Int. Cl.
*G06F 17/00* (2006.01)
*G06N 5/02* (2006.01)

(52) U.S. Cl. ........................................ 706/47
(58) Field of Classification Search .................. 706/47
See application file for complete search history.

(56) References Cited

U.S. PATENT DOCUMENTS

| | | | | |
|---|---|---|---|---|
| 5,706,406 | A * | 1/1998 | Pollock | 706/51 |
| 6,154,876 | A * | 11/2000 | Haley et al. | 717/133 |
| 6,158,045 | A * | 12/2000 | You | 717/124 |
| 6,185,506 | B1 * | 2/2001 | Cramer et al. | 506/8 |
| 6,240,374 | B1 * | 5/2001 | Cramer et al. | 506/8 |
| 6,631,404 | B1 * | 10/2003 | Philyaw | 709/217 |
| 6,636,892 | B1 * | 10/2003 | Philyaw | 709/217 |
| 6,791,588 | B1 * | 9/2004 | Philyaw | 715/862 |
| 6,820,256 | B2 * | 11/2004 | Fleehart et al. | 717/155 |
| 6,970,916 | B1 * | 11/2005 | Philyaw | 709/217 |
| 7,096,162 | B2 * | 8/2006 | Cramer et al. | 703/1 |
| 7,136,758 | B2 * | 11/2006 | Patterson et al. | 702/19 |
| 7,159,116 | B2 * | 1/2007 | Moskowitz | 713/176 |
| 7,184,893 | B2 * | 2/2007 | Cramer et al. | 702/19 |
| 7,392,285 | B2 * | 6/2008 | Philyaw | 709/204 |
| 7,412,666 | B2 * | 8/2008 | Philyaw | 715/852 |
| 2002/0046393 | A1 * | 4/2002 | Leino et al. | 717/7 |

OTHER PUBLICATIONS

Engler et al. "Bugs as Deviant Behavior: A General Approach to Inferring Errors in Systems Code". Oct. 21, 2001, ACM 18th Symposium on Operating Systems Priciples.*
Engler et al. "Checking System Rules Using System-Specific, Programmer-Written Compiler Extensions". 2000, Proceedings of hte 4th Symposium on Operating System Design and Implementation.*

(Continued)

*Primary Examiner*—Michael B Holmes
(74) *Attorney, Agent, or Firm*—Crawford Maunu PLLC

(57) ABSTRACT

Various apparatus and methods are disclosed for identifying errors in program code. Respective numbers of observances of at least one correctness rule by different code instances that relate to the at least one correctness rule are counted in the program code. Each code instance has an associated counted number of observances of the correctness rule by the code instance. Also counted are respective numbers of violations of the correctness rule by different code instances that relate to the correctness rule. Each code instance has an associated counted number of violations of the correctness rule by the code instance. A respective likelihood of the validity is determined for each code instance as a function of the counted number of observances and counted number of violations. The likelihood of validity indicates a relative likelihood that a related code instance is required to observe the correctness rule. The violations may be output in order of the likelihood of validity of a violated correctness rule.

25 Claims, 4 Drawing Sheets

OTHER PUBLICATIONS

Engler et al. "Checking System Rules Using System-Specific, Programmer-Written Compiler Extensions", 2000, Stanford University.*

Schneidewind. "Measuring and Evaluating Maintenance Process Using Reliability, Risk, and Test Metrics" 1999, IEEE Transactions on Software Engineering, vol. 25. pp. 769-781.*

Engler, D., Chelf, B., Chou, A., and Hallem, S., *Checking System Rules Using System-Specific, Programmer-Written Compiler Extensions*, Computer Systems Laboratory, Stanford University, Stanford, CA, In Proceedings of Operating Systems Design and Implementation (OSDI), 16 pages.

Ernst, M., Cockrell, J., Griswold, W. and Notkin, D., *Dynamically Discovering Likely Program Invariants to Support Program Evolution*, IEEE Transactions on Software Engineering, 27(2):1-25, Feb. 2001.

Savage, S., Burrows, M., Nelson, G., Sobalvarro, P., and Anderson. T., *Eraser: A Dynamic Data Race Detector for Multi-threaded Programs*, ACM Transactions on Computer Systems, 15(4):391-411, 1997.

* cited by examiner

STATISTICAL INFERENCE OF STATIC ANALYSIS RULES

GOVERNMENT LICENSE RIGHTS

This invention was made with Government support under contracts MDA904-98-C-A933, awarded by the Defense Advanced Research Projects Agency; NAS1-98139 awarded by the NASA Langley Research Center; and F29601-01-2-0085 awarded by the United States Air Force. The Government has certain rights in this invention.

FIELD OF THE INVENTION

The present invention relates generally to analysis of software.

BACKGROUND

Computers and accompanying software touch nearly every aspect of our lives. Computers and software extend well beyond the computer workstations used in many vocations. For example, extensive computer systems and supporting software are used in telephone services, both mobile and wired, airline reservation systems, point-of-sale terminals at retail outlets, and at all levels of the health-care industry. As society increasingly relies on computers and software, there is a corresponding rising expectation that the systems will be reliable and not be prone to failure.

Not only are computers and software affecting more daily activities, but the size and complexity of software packages are increasing as well. A software package of previous generations may have been on the order of thousands or tens-of-thousands of lines of code. Today, applications with millions of lines of code are not uncommon. Managing the growth of software while attending to reliability issues challenges even the most talented software developers.

The presence of programming errors, or "bugs," grows with the size and complexity of software applications. For some applications, bugs may be tolerable. However, for life-critical applications, a bug may result in loss of life. Thus, ensuring that a software package is free of bugs may not only be a desirable part of the software development effort, but a necessary undertaking.

Both manual and automated processes have been used in attempts to verify that a software package is free of bugs. Manual processes include inspection of source code by a developer and colleagues and testing of the software's basic functions while the software is running. Automated processes include software drivers that interact with the software package, as well as software tools that analyze and report deficiencies in the source code.

Manual inspection of source code is costly, time consuming, and limited in effectiveness by the availability of resources, such as time and people. Whether automated or manual, testing may require elaborate set-up procedures, require a great deal of time, and exercise only the main functions of the software package. Thus, some portions of the software package may go untested and bugs go uncovered before the software is deployed for real-life use.

Software tools that analyze source code and report bugs may be very useful in uncovering certain types of bugs. However, one obstacle to finding program errors in a large software package is the availability of the correctness rules that the source code must follow. These rules are often undocumented or specified in an ad hoc manner, which makes assembling the rules for use by a tool difficult. In addition, cost considerations often prohibit manually specifying or discovering all the correctness rules that a large package must obey.

SUMMARY

Various apparatus and methods are disclosed for identifying errors in program code. Respective numbers of observances of at least one correctness rule by different code instances that relate to the at least one correctness rule are counted in the program code. Each code instance has an associated counted number of observances of the correctness rule by the code instance. Also counted are respective numbers of violations of the correctness rule by different code instances that relate to the correctness rule. Each code instance has an associated counted number of violations of the correctness rule by the code instance. A respective likelihood of the validity is determined for each code instance as a function of the counted number of observances and counted number of violations. The likelihood of validity indicates a relative likelihood that a related code instance is required to observe the correctness rule. The violations may be output in order of the likelihood of validity of a violated correctness rule.

BRIEF DESCRIPTION OF THE DRAWINGS

The invention may be more completely understood in consideration of the Detailed Description of various embodiments of the invention that follows in connection with the accompanying drawings, in which.

Figure 1:
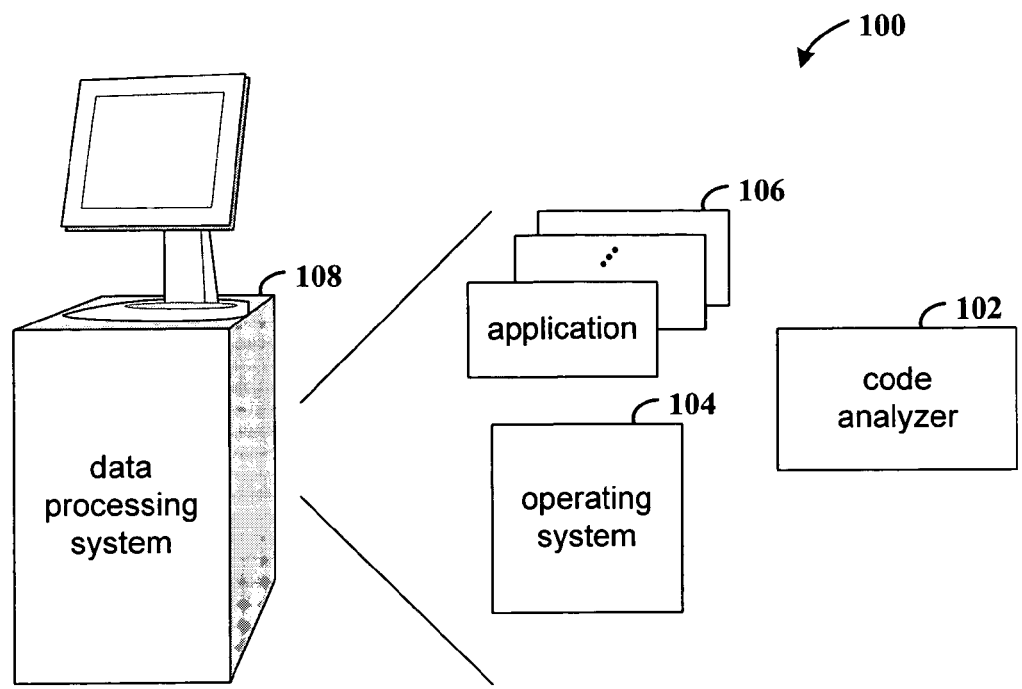
FIG. 1 is a block diagram of a system in which a program code analyzer automatically infers correctness rules from program code and uses the correctness rules to assist in identifying and correcting program bugs, according to an example embodiment of the present invention.

While the invention is amenable to various modifications and alternative forms, specifics thereof have been shown by way of example in the drawing and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is directed to an approach for analyzing software. According to one example embodiment of the present invention, such checking information is automatically extracted from the source code itself, thereby avoiding the need for a priori knowledge of system rules. The invention finds code that is incorrect without programmer specification of rules for correct code. In another embodiment, the correctness rules are automatically derived from the program code and ranked by probable validity.

FIG. 1 illustrates a system 100 in which a program code analyzer 102 automatically infers correctness rules from program code 104, 106 and uses the correctness rules to assist in identifying and reporting program bugs, according to an example embodiment of the present invention. The analyzer can be deployed on a variety of different classes of data processing systems 108, ranging from desktop computers to large-scale servers. The analyzer is useful in any data processing arrangement or software development environment in which program code is developed and tested. The analyzer may be bundled with a data processing arrangement and a suite of software tools, as part of a suite of software development tools marketed separate from the host data processing arrangement, or as a stand-alone tool.

Analyzer 102 is useful for finding errors in all types and levels of software. For example, the analyzer is useful in finding errors in operating system software 104 as well as in application software 106. Without adequately eliminating program bugs from the operating system and other mission-critical software, the data processing system on which the software executes is essentially useless. Thus, analyzer 102 is critical to not only the stability of host data processing system 108, but also to the stability of other data processing systems that are targeted for software developed on system 108. As explained below, various embodiments of the invention are useful in automatically identifying correctness rules and assisting in identifying false-positive error reports.

An example is presented below to illustrate automatically identifying correctness rules by statistical inference. One example addresses how to infer which functions can return NULL pointers. This is accomplished by counting the number of times the program code compares the result of each function against NULL versus the number of times the code uses the result without any comparison. The higher the ratio of uses-with-checks to uses-without-checks, the more likely the function must be checked. Another example addresses how to determine whether two functions, a( ) and b( ) must be paired. This can be determined by counting the number of times a( ) appears with b( ) versus the number of times each function appears without the other. Functions that must be paired will have a high ratio of paired calls to unpaired calls.

To determine whether a correctness rule is valid, it is assumed that the rule is valid, and the number of times the code follows the rule (observances) is counted versus the number of times the code does not (violations) follow the rule. The larger the skew in evidence, the more likely that the rule is valid.

The ideas of hypothesis testing are used to weigh the evidence. The rules are viewed as binary trials (independent events that have exactly one of two discrete outcomes). To weigh such evidence, the binomial formula is used to compute the probability that an event had k successes (observances) out of n attempts given that the probability of success is p:

$$\binom{n}{k} \times p^k (1-p)^{n-k}$$

For a large number of trials, the ratio k/n should approach p. If the ratio does not, this is strong evidence that the true probability is not p. Conversely, for a small number of trials, it is not unexpected that k/n is far from p. A degenerate example is a single toss of a fair coin: the frequency of heads will be 0 or 1, while the expected ratio is 0.5. The expected range of the divergence can be quantified using the standard deviation, which for the binomial formula is given by:

$$\sigma = \sqrt{p \times (1-p)/n}$$

The standard deviation approaches zero as n increases to infinity. The ratio k/n is expected to converge to p given an infinite number of trials.

The following measurement computes how many standard deviations away the observed ratio of observances to violations is from the expected ratio for the given number of trials:

$$z = (k/n - p)/\sqrt{p \times (1-p)/n}$$

As the number of standard deviations increases, the improbability of the event does as well. This normalized measurement permits ranking of different sample sizes with different ratios from most to least probable. This is done by counting the number of observances and violations for a given trial, and ranking the violations (the potential errors) using the computed z value above. This process is referred to as z-ranking.

That value that is used for p is selected based on the assumption that the code is usually correct. Thus, p is set to a value >=0.8, depending on how harshly violations are to be penalized. For example, a value of 0.8 corresponds to one violation in every five occurrences. Error rates equal to this will have a z value of zero; error rates better than it will have a positive value (they are a positive number of standard deviations from p); and error rates worse will have a negative value.

Figure 2:
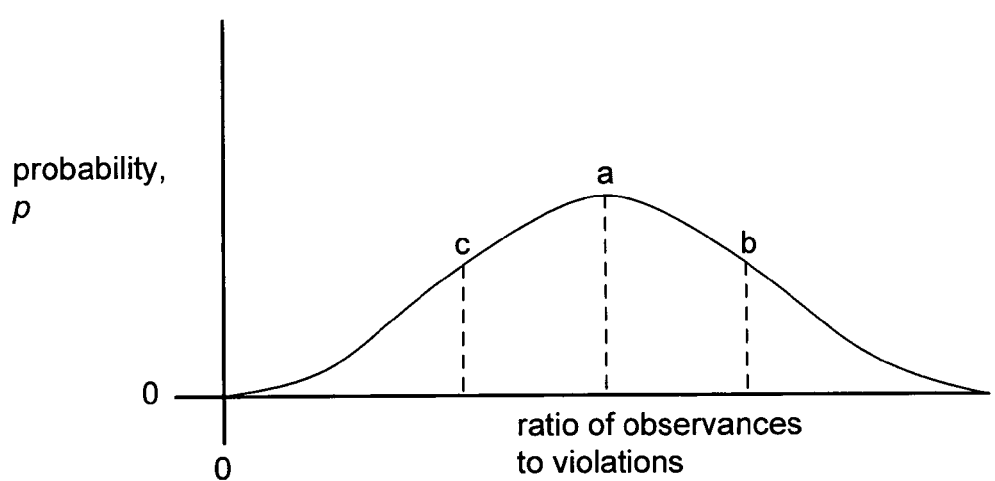
FIG. 2 illustrates a normal probability distribution of the ratio of observances to violations of a rule by program code.

FIG. 2 illustrates a normal probability distribution of the ratio of observances to violations of a rule by program code. The point labeled a in the figure is the mean of the distribution. If the ratio of observances to violations in the program code has the value a, then the program code behaves according to a hypothesized rule. The ranking, computed using the z formula above, for point a is 0.

For point b, the observed ratio exceeds the expected ratio. Because the evidence suggests that the hypothesized rule is almost always followed, violations of that rule are important. The computed z value for point b is a normalized measure of the distance along the x-axis between points a and b. The normalization factor in the z formula accounts for differences in population size. Thus, the computed z value for point b will be greater than 0 and any violations of the rule at point b will be ranked above those at point a.

For point c, the ratio of observances to violations for a rule is substantially less than expected, which indicates that the hypothesized rule is not valid. In this case, the z rank for violations of the rule at point c will be a negative number, and these violations will be ranked lowest.

Figure 3:
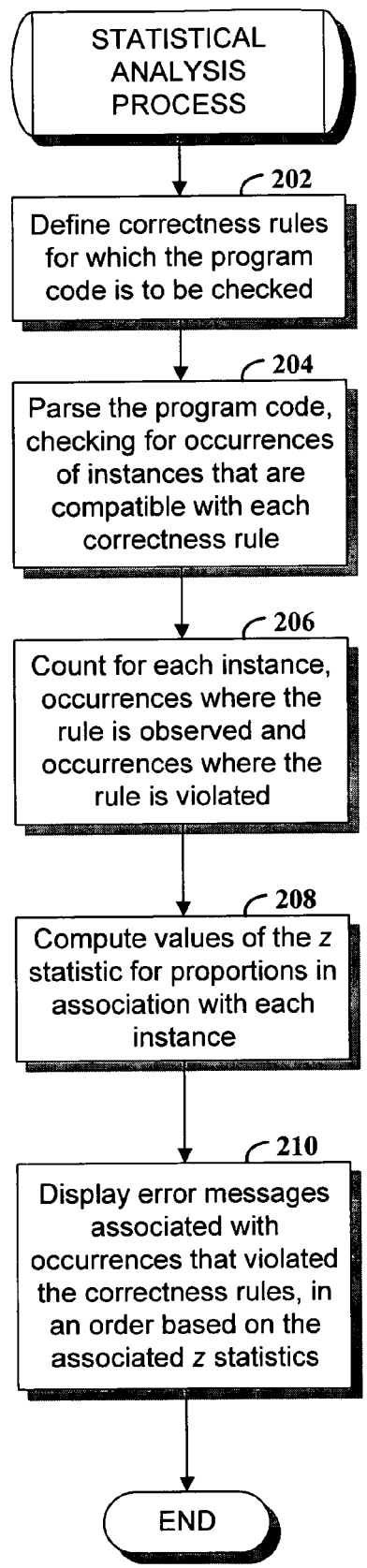
FIG. 3 is a flowchart of an example process for inferring errors in source code by statistically analyzing the source code.

FIG. 3 is a flowchart of an example process for inferring errors in source code by statistically analyzing the source code. The process generally entails parsing input program code for observances and violations of various hypothesized correctness rules (steps 202, 204). The observances and violations are counted by occurrences of instances that are relevant to the correctness rules (further explanation of the terms correctness rule, instance, relevant, occurrence, observance, and violation is provided in the following paragraph), and the counted observances and violations are used to compute a z statistic value for each instance (steps 206, 208). The state diagrams of FIGS. 4-7 further illustrate the counting of observances and violations for 4 different examples of correctness rules. The violations may then be sorted by the z statistic values computed for the instances, with the sorted order being violations that are most likely to be errors to violations that are least likely to be errors (step 210). The violations may then be inspected to determine which violations are actual errors. It will be appreciated that at some point in the sorted violations the associated z statistic values may be indicative of false-positive violations (violations that are not actually errors), the inspection of the errors may stop at that point.

The following terms are used in this description, and the following explanation is provided so that the various working examples and embodiments of the invention may be better understood. The terms include: correctness rule, instance, relevant, occurrence, observance, and violation. A "correctness rule" specifies a generalized hypothesis of program code usage that is believed to be correct usage. For example, a hypothesis might be that correct program code obtains some lock before manipulating some variable, and the correctness rule may be states as lock(l) protects v, where l is a generalized specification of a lock and v is a generalized specification of the protected variable.

An "instance" refers to one or more specific instructions in the program code that are "relevant" to a correctness rule and that allow checking of whether an "occurrence" observes or violates the correctness rule. "Relevant" in this description is different from "observe" or "observance." "Relevant" means that the one or more specific instructions satisfy some set of criteria, and the relevant instructions may be checked as to whether the instructions "observe" or "violate" the correctness rule. For example, an instance may be a call in the program code, such as lock(MASTER_RECORD), where MASTER_RECORD is a specific variable defined in the program. This instance is relevant to the correctness rule, lock(l) protects v, because further parsing of the code may be performed to determine which program variables are manipulated while the lock of MASTER_RECORD is in effect. It should be understood that lock(MASTER_RECORD) is an example of one instance, and lock(MASTER_TABLE) is an example of another instance that is relevant to the correctness rule.

An "occurrence" relates to an instance and is used to determine whether the correctness rule has been observed or violated, and thereby count an observance or count a violation. For example, if the function, read(home_address), follows lock(MASTER_RECORD) and is called before MASTER_RECORD is unlocked, then the calls to lock(MASTER_RECORD) and read(home_address) define an occurrence in which the correctness rule is observed. If at some other point in the program code, read(home_address) is called without having first called lock(MASTER_RECORD), then this is another occurrence, but the occurrence violates the correctness rule. It should be understood that a call to write (home_address) that follows lock(MASTER_RECORD) is another occurrence related to the lock(MASTER_RECORD) instance.

The observances and violations of a correctness rules are counted for each instance. For example, if the function, read (home_address), follows lock(MASTER_RECORD) and is called before MASTER_RECORD is unlocked, the occurrence is counted as an observance for the lock(MASTER_RECORD) instance. Separate counts of observances and violations are performed for other instances. For example, separate counts are performed for the occurrences related to the instance, lock(MASTER_TABLE).

In one example embodiment, the correctness rules may be defined and checked using a high-level state machine language. An example language is MetaL. Those skilled in the art will appreciate that the checkers may be implemented as extensions to a compiler or as part of a stand-alone analysis tool. Example 1 below illustrates code that implements a statistical checker that infers which functions can return NULL. The statistical checker tracks pointers returned by any routine rather than just pointers returned from a single function, such as kmalloc. The checker outputs a VIOLATION message when a pointer is used without a check against NULL, and outputs an OBSERVANCE message when a pointer is used after a check against NULL.

```
sm null_checker_stat local {
state killvars decl any_pointer v;
decl any_fn_call call;
decl any_args args;
decl any_expr x, y;
// Put any pointer returned by a function in
// unknown state and record function name in
// data field.
start:
    { v = call(args) } ==> v.unknown,
    { mc_v_set_data(v, mc_identifier(call)); }
;
v. unknown:
    { (v == NULL) } || { (v != NULL) } ==> v.stop,
        { v_note("NULL_STAT", v,
            "Checking ptr [OBSERVANCE=$data]"); }
    |{ *(any *)v } || { memset(v, x, y) } ==> v.stop,
        { v_err("NULL_STAT", v,
            "Using \"$name\" illegally! [VIOLATION=$data]
            "); }
;
}
```
Example 1

The code in Example 2, below, illustrates application of the checker of Example 1 to a specific segment of program code.

```
void v_contrived(int *p, int *q) {
q = malloc(sizeof *q);
// Checking ptr [OBSERVANCE=malloc]
if(!q)
    return;
p = malloc(sizeof *p);
// Using "p" illegally! [VIOLATION=malloc]
memset(p, 0, sizeof *p);
p = foo( );
*p; // Using "p" illegally! [VIOLATION=foo]
q = foo( );
*q; // Using "q" illegally! [VIOLATION=foo]
}
```
Example 2

There are four calls to functions that return a pointer: two for malloc and two for foo. The returned pointer of malloc is checked once before use (an observance) and used once without checking (a violation). Both calls to foo use the return pointer without checks (two violations). Thus, the z-rank for the single malloc error message will be:

$$1/2 - 0.8/\sqrt{0.8*(1-0.8)/2} = -106$$

And the z value for the two error messages for foo will be $$0/2 - 0.8/\sqrt{0.8*(1-0.8)/2} = -2.83$$

Thus, the error for malloc will be ranked above the errors for foo; in general the counts and skew are much higher. The error message for malloc will be ranked above the two for foo, since malloc has one observance and one violation, while foo has no observances and two violations.

Figure 4:
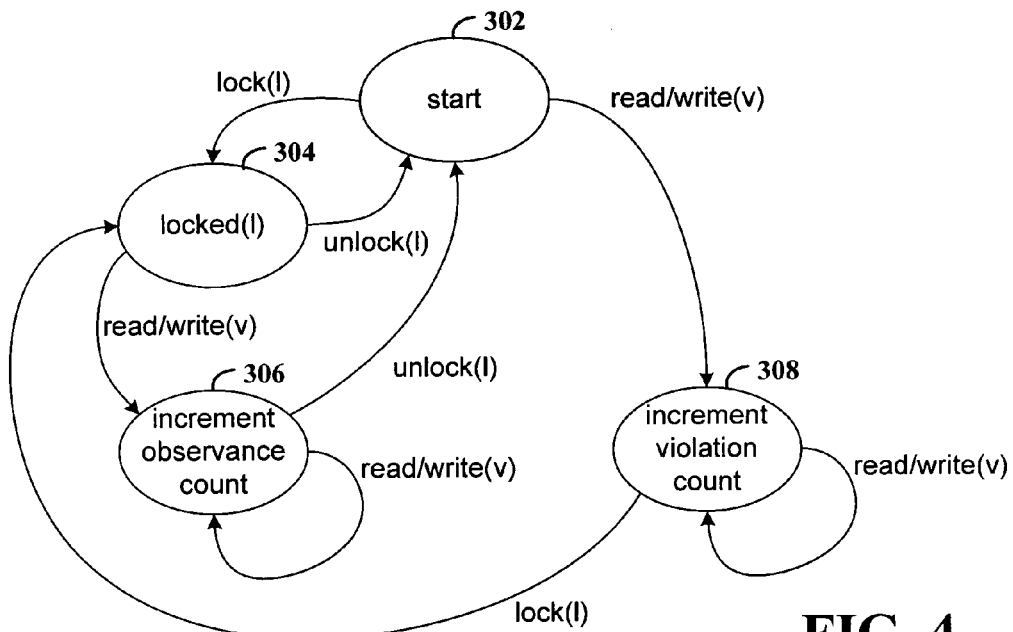
FIG. 4 is an example state diagram for inferring whether a lock on one variable is used to protect another variable.

FIG. 4 is an example state diagram for inferring whether a lock on one variable is used to protect another variable. To infer those variables, v, that must always be protected by locks, l, the checker is configured with the definition of those operations capable of manipulating a variable (shown as read/write in the figure). This definition depends on the particular programming language, but it is a language independent concept. Similarly, those operations are associated with locking and unlocking a resource is configured in the checker (shown as lock or unlock in the figure).

When lock operation is encountered by the checker, the checker transitions from start state 302 to locked(l) state 304, indicating that the particular lock named, l, is now locked. An unlock operation on l before any read/write operations are performed on l returns the checker the start state 302. If any named storage location in the program (generically referred to as v) is accessed while in the locked state 304, the checker increments the observance count (state 306). Each additional read/write operation while in state 306 causes the checker to increment the observance count. An unlock(l) encountered by the checker while in state 306 causes the checker to transition back to start state 302. Separate observance and violation counts are associated with different pairs of locks and variables. For example, one set of counts is associated with the pair lock, l-1, and variable, v-1, and another set of counts is associated with lock, l-1, and variable, v-2. An inferred rule for the l-1, v-1 pair is of the form "l-1 must protect accesses to v-1"

If v is accessed outside the locked state 304, the checker increments the violation count (state 308). Each additional read/write operation while in state 308 causes the checker to increment the violation count. A lock(l) encountered by the checker while in state 308 causes the checker to transition to locked(l) state 304.

Figure 5:
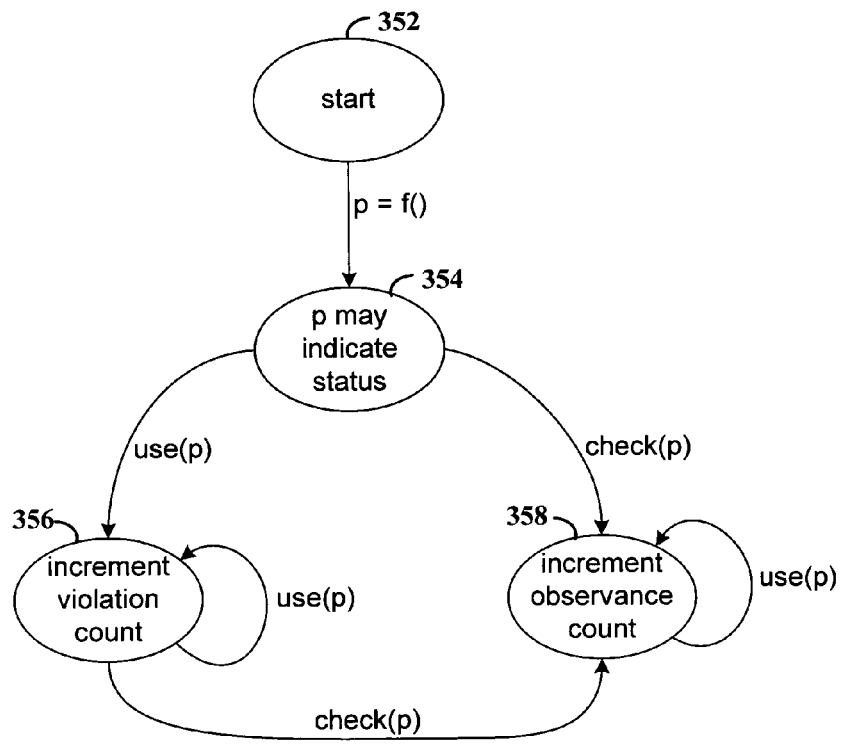
FIG. 5 is an example state diagram for inferring whether a function must be checked for failure after returning control.

FIG. 5 is an example state diagram for inferring whether a function must be checked for failure after returning control. A checker that implements the state diagram may be used to find errors where the results returned by functions are not checked or are incorrectly checked for failure. Two types of errors may be detected with checkers implemented according to the state machine. One type of error is the failure to check that a NULL pointer was returned from a function before dereferencing the pointer. The second type of error is the failure to check integer codes returned from a function before using results of the function.

An example area in which problems of this nature may occur is in the kernel code of an operating system. Kernel code must check for failure at every resource exhaustion or access control point. The enormous number of such cases makes these types of errors common. Another example problem area is the failure of program code to check for the failure of non-memory allocation functions. These types of failures may not be manifested by a complete system failure and thereby make uncovering the source of the problem more difficult.

To infer functions that must be checked for failure, a checker is configured to detect when the results returned by a function are used in the program code and detect when the program code checks the results before using the results. The checker assumes that all functions may return results that must be checked before it is appropriate to use the results.

When the checker finds that results are returned from a function (p=f( )), the check transitions from start state 352 to state 354, in which the results, p, may indicate a failure or status returned by function f. If the results, p, are used (use(p)) before the results are checked, the checker transitions to state 356 and increments the violation count. Each subsequent use of p without checking the results causes the checker to further increment the violation count. It will be appreciated that separate observance and violation counts are made for each function that returns results.

If the results, p, are checked (check(p)) before the results are used, the checker transitions to state 358 and increments the observance count. Each subsequent use of p causes the checker to further increment the observance count.

Another category of correctness rules that may be inferred from analysis of the program code includes temporal rules. Temporal rules are those in which sequences of actions must be followed. For example, one temporal rule is, no <a> after <b>, where <a> and <b> denote actions a and b. A specific instance is that freed memory cannot be subsequently referenced. Another temporal rule is, <b> must follow <a>, for example, an unlock action must follow a lock action. A contextual temporal rule is, in context <x>, do <b> after <a>. A specific instance of a contextual temporal rule is on an error path (denoted, in context <x>), reverse the side effects by doing <b> then <a>.

Figure 6:
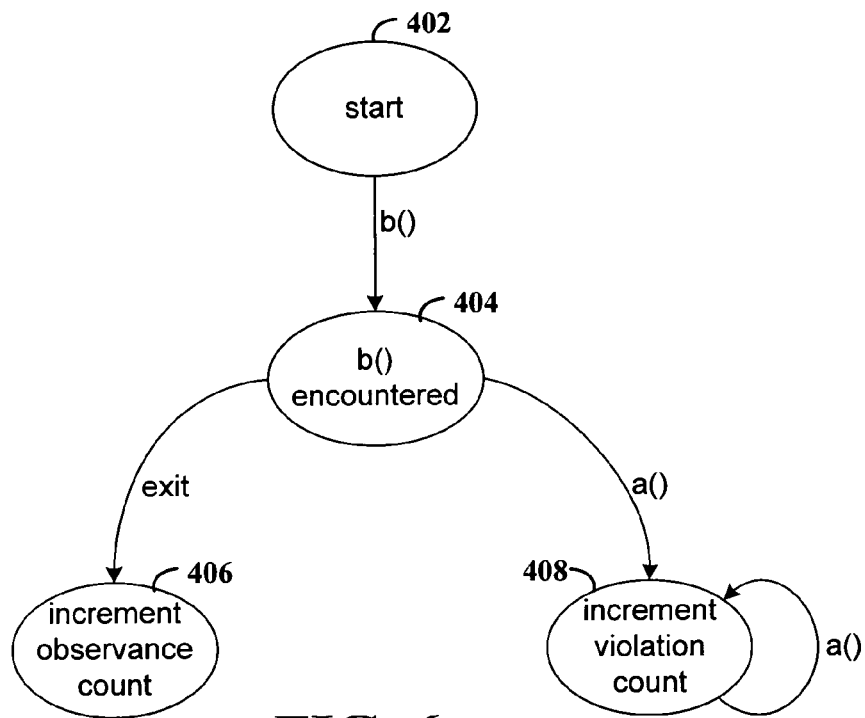
FIG. 6 is an example state diagram for inferring whether one function must not follow another function.

FIG. 6 is an example state diagram for inferring whether one function must not follow another function. To infer functions, a, that must not follow functions, b, the checker assumes that all functions that are encountered are possible candidates. Whenever a function call is encountered, the checker transitions from start state 402 to b( ) encountered state 404. If the program code exits function b's scope (e.g., exits or returns from b( )) without a call to a, the checker transitions to state 406 and increments the observance count. If the checker encounters a call from state 404, the checker transitions to state 408 and increments the violation count.

In an example application, this rule is used to check whether the program code attempts to access memory that has been freed. Without using the inference techniques of the various embodiments of present invention, finding all violations of the rule may be difficult because many systems have a large set of deallocation functions, ranging from general-purpose routines, to wrappers around these routines, to a variety of ad hoc routines that manage their own internal free lists. A checker implemented in accordance with the state diagram may be used to infer all of these types of deallocation techniques.

Figure 7:
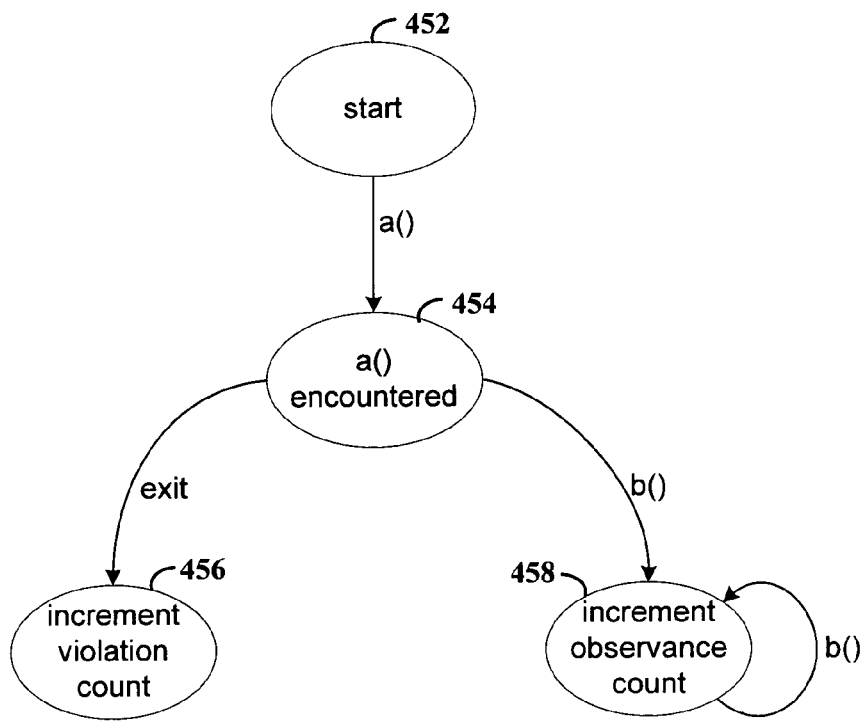
FIG. 7 is an example state diagram for inferring whether one function must follow another function.

FIG. 7 is an example state diagram for inferring whether one function must follow another function in the program code. To infer functions b that must follow functions a, the checker is configured to assume that all functions encountered are possible candidates. When a function call is encountered in the program code, the checker transitions from start state 452 to a( ) encountered state 454. If function a's scope is exited before invoking a call to b, the checker transitions to state 456 and increments the violation count. If a call to b is encountered, the checker transitions to step 458 and increments the observance count.

A checker implemented according to the state diagram assumes that all possible function pairs must observe the rule. For each function pair, $f_i$, $f_j$, the checker counts the number of times that each pair is encountered (n), and the number of times each pair violates the rule (e). The pairs are then ranked by computing the z statistic for each pair as described previously for the function-argument pairs.

Various other embodiments address controlling the very large number of combinations of function pairs likely to be present in the program code. In one embodiment, all possible paths are pre-processed to identify all plausible pairs. In another embodiment, the number of false positives may be reduced by using the z statistic to rank violations both by function pair plausibility as well as by individual violation.

The plausible pairs are identified by scanning the program code for occurrences of function call sequences that conform to a selected set of patterns. The function pairs are selected from these occurrences and provided to the checker. The checker then limits counting of occurrences and violations to these specific function pairs.

Examples 1, 2, and 3 below illustrate three idiomatic function call patterns.

p=foo( . . . );
. . .
bar(p);
. . .
baz(p);
Example 1
foo(p, . . . );
. . .
bar(p, . . . );
. . .
baz(p, . . . );
Example 2
foo( );
. . .
bar( );
. . .
baz( );
Example 3

The pattern of Example 1 describes a function call sequence in which the result returned by a function is assigned to a variable that is then passed as the first argument to more than one subsequent function call. An example of this is when a handle is returned, used in some number of calls, and then possibly released. The pattern identified from Example 1 would be foo:bar:baz. The checker looks at the full trace and, in the most general case, extracts all possible pairs. For example, the checker checks for the function pair foo:bar and separately checks for the function pair bar:baz. This may not be feasible in practice so only the pair foo:baz is considered viable, thereby limiting the analysis to the first and last function in the trace.

The pattern of Example 2 describes a function call sequence in which a variable is passed without an initial assignment. Again the trace is foo:bar:baz, which has 3 possible pairs (foo:bar, foo:baz, and bar:baz), although the search may be narrowed as previously described. The distinction from Example 1 is whether or not p=foo( ) has been found prior to the sequence in Example 2.

The pattern of Example 3 describes a function call sequence in which there is a series of functions calls in which no arguments are passed. The trace is foo:bar:baz, which has 3 possible pairs.

The plausible function pairs may be selected from the set of occurrences that conform to the set of patterns (e.g., the patterns from Examples 1, 2, and 3) in the program code. In one embodiment, the occurrences may be ranked using the z statistic. An observance is counted for an occurrence of a function pair in the code (e.g., foo:baz). A violation is counted when the first function of a pair occurs without an occurrence of the second function (e.g., foo:brak, without an occurrence of baz).

The number of false positives may be reduced by using the z statistic to rank violations both by function pair plausibility as well as by individual violation. For example, if the program code includes many function calls to function a with subsequent calls to function b, a false positive may result where there is single call to function a and no subsequent call to function b. This type of false positive may occur, for example, if a wrapper routine separates the call to a from the call to b, such as where a locking wrapper function acquires a lock but does not release the lock. It would be desirable to somehow rank the false positive violation below other violations of the rule. In one embodiment, this is accomplished by computing an additional z statistic to rank the errors within each checked function based on the number of paths within that function that contain a given a-b pair (n in the z statistic computation) versus the number of paths that only contain a (k in the z statistic computation). This additional ranking results in the most likely errors being ranked higher.

Violations are thereby grouped according to function pair, with the groups sorted by z statistic ranking of the function pair. The z statistic ranking of each function pair is computed in terms of the number of times that each pair is encountered and the number of times the rule is observed as previously described. Within each group, violations are sorted by the z statistic of the individual error.

Those skilled in the art will appreciate that various alternative computing arrangements would be suitable for hosting the processes of the different embodiments of the present invention. In addition, the processes may be provided via a variety of computer-readable media or delivery channels such as magnetic or optical disks, tapes, electronic storage devices, or as application services over a network.

While the present invention has been described with reference to several particular example embodiments, those skilled in the art will recognize that many changes may be made thereto without departing from the spirit and scope of the present invention. The present invention is applicable to a variety of implementations and other subject matter, in addition to those discussed herein.

What is claimed is:

1. A method for identifying errors in program code, comprising:
    performing by a processor the steps including,
        counting in the program code respective numbers of observances of at least one correctness rule by different code instances that relate to the at least one correctness rule, wherein each code instance has an associated counted number of observances of the correctness rule by the code instance;
        counting in the program code respective numbers of violations of the at least one correctness rule by different code instances that relate to the at least one correctness rule, wherein each code instance has an associated counted number of violations of the correctness rule by the code instance;
        determining for each code instance a respective likelihood of validity of the code instance as a function of the counted number of observances and counted number of violations, wherein the likelihood of validity indicates a relative likelihood that a related code instance is required to observe the correctness rule; and
        outputting the code instances in order of the likelihood of validity of a violated correctness rule.

2. The method of claim 1, wherein the determining step further comprises determining a likelihood of the validity of each code instance as a function of an expected ratio of observances to violations, the counted number of observances, and the counted number of violations.

3. The method of claim 2, wherein the determining step further comprises statistically ranking each code instance according to a number of standard deviations away, a ratio of the counted number of observances to the counted number of violations is from the expected ratio.

4. The method of claim 3, wherein statistically ranking each code instance includes determining a z statistic for proportions.

5. The method of claim 1, further comprising:
wherein a first correctness rule specifies that a variable must be protected by a lock before accessing the variable;
the step of counting an observance of the first correctness rule by a particular code instance includes identifying program code that locks a particular first variable followed by program code that accesses a particular second variable; and
the step of counting a violation of the first correctness rule by the particular code instance includes identifying program code that accesses the particular second variable where no preceding program code locks the particular first variable.

6. The method of claim 1, further comprising:
wherein a first correctness rule specifies that invocation of a first function must not follow an invocation of a second function in the program code;
the step of counting an observance of the first correctness rule by a particular code instance includes identifying program code that includes a sequence of instructions that includes invocation of a particular second instruction and no previous invocation of a particular first function; and
the step of counting a violation of the first correctness rule by the particular code instance includes identifying program code that includes a sequence of instructions in which an invocation of a particular first function is present following invocation of a particular second instruction.

7. The method of claim 1, further comprising:
wherein a first correctness rule specifies that invocation of a first function must follow an invocation of a second function in the program code;
the step of counting an observance of the first correctness rule by a particular code instance includes identifying program code that includes a sequence of instructions that includes an invocation of a particular first function following invocation of a particular second instruction; and
the step of counting a violation of the first correctness rule by the particular code instance includes identifying program code that includes a sequence of instructions that includes an invocation of the particular second instruction without a previous invocation of the particular first function.

8. The method of claim 1, further comprising:
wherein a first correctness rule specifies that data returned from a first function must be tested for a status indication;
the step of counting an observance of the first correctness rule by a particular code instance includes identifying program code that includes a sequence of instructions that includes an invocation of a particular first function and a subsequent test of data returned from the particular first function; and
the step of counting a violation of the first correctness rule by the particular code instance includes identifying program code that includes a sequence of instructions that includes an invocation of a particular first function without a subsequent test of data returned from the particular first function.

9. An apparatus for identifying errors in program code, comprising:
means for counting in the program code respective numbers of observances of at least one correctness rule by different code instances that relate to the at least one correctness rule, wherein each code instance has an associated counted number of observances of the correctness rule by the code instance;
means for counting in the program code respective numbers of violations of the at least one correctness rule by different code instances that relate to the at least one correctness rule, wherein each code instance has an associated counted number of violations of the correctness rule by the code instance;
means for determining for each code instance a respective likelihood of the validity as a function of the counted number of observances and counted number of violations, wherein the likelihood of validity indicates a relative likelihood that a related code instance is required to observe the correctness rule; and
means for outputting the code instances in order of the likelihood of validity of a violated correctness rule.

10. A system for identifying errors in program code, comprising:
a data processing arrangement;
an analyzer hosted on the data processing arrangement, the analyzer configured to,
count in the program code respective numbers of observances of at least one correctness rule by different code instances that relate to the at least one correctness rule, wherein each code instance has an associated counted number of observances of the correctness rule by the code instance;
count in the program code respective numbers of violations of the at least one correctness rule by different code instances that relate to the at least one correctness rule, wherein each code instance has an associated counted number of violations of the correctness rule by the code instance;
determine for each code instance a respective likelihood of validity of the code instance as a function of the counted number of observances and counted number of violations, wherein the likelihood of validity indicates a relative likelihood that a related code instance is required to observe the correctness rule; and
output the code instances in order of the likelihood of validity of a violated correctness rule.

11. The system of claim 10, wherein the analyzer is further configured to, in determining of likelihood of validity, determine a likelihood of the validity of each code instance as a function of an expected ratio of observances to violations, the counted number of observances, and the counted number of violations.

12. The system of claim 11, wherein the analyzer is further configured to, in determining of likelihood of validity, statistically rank each code instance according to a number of standard deviations away, a ratio of the counted number of observances to the counted number of violations is from the expected ratio.

13. The system of claim 12, wherein the analyzer is further configured to, in statistically ranking each code instance, determine a z statistic for proportions.

14. The system of claim 10, further comprising:
wherein the analyzer is configured to count code instances of a first correctness rule that specifies that a variable must be protected by a lock before accessing the variable;

in counting an observance of the first correctness rule by a particular code instance, the analyzer is configured to identify program code that locks a particular first variable followed by program code that accesses a particular second variable; and in counting a violation of the first correctness rule by the particular code instance, the analyzer is configured to identify program code that accesses the particular second variable where no preceding program code locks the particular first variable.

15. The system of claim 10, further comprising:

wherein the analyzer is configured to count code instances of a first correctness rule specifies that invocation of a first function must not follow an invocation of a second function in the program code;

in counting an observance of the first correctness rule by a particular code instance, the analyzer is configured to identify program code that includes a sequence of instructions that includes invocation of a particular second instruction and no previous invocation of a particular first function; and in counting a violation of the first correctness rule by the particular code instance, the analyzer is configured to identify program code that includes a sequence of instructions in which an invocation of a particular first function is present following invocation of a particular second instruction.

16. The system of claim 10, further comprising:

wherein the analyzer is configured to count code instances of a first correctness rule specifies that invocation of a first function must follow an invocation of a second function in the program code;

in counting an observance of the first correctness rule by a particular code instance, the analyzer is configured to identify program code that includes a sequence of instructions that includes an invocation of a particular first function following invocation of a particular second instruction; and in counting a violation of the first correctness rule by the particular code instance, the analyzer is configured to identify program code that includes a sequence of instructions that includes an invocation of the particular second instruction without a previous invocation of the particular first function.

17. The system of claim 10, further comprising:

wherein the analyzer is configured to count code instances of a first correctness rule specifies that data returned from a first function must be tested for a status indication;

in counting an observance of the first correctness rule by a particular code instance, the analyzer is configured to identify program code that includes a sequence of instructions that includes an invocation of a particular first function and a subsequent test of data returned from the particular first function; and in counting a violation of the first correctness rule by the particular code instance, the analyzer is configured to identify program code that includes a sequence of instructions that includes an invocation of a particular first function without a subsequent test of data returned from the particular first function.

18. An article of manufacture, comprising:

an electronically readable storage medium configured with instructions for causing a processor to perform the steps including, counting in the program code respective numbers of observances of at least one correctness rule by different code instances that relate to the at least one correctness rule, wherein each code instance has an associated counted number of observances of the correctness rule by the code instance;

counting in the program code respective numbers of violations of the at least one correctness rule by different code instances that relate to the at least one correctness rule, wherein each code instance has an associated counted number of violations of the correctness rule by the code instance;

determining for each code instance a respective likelihood of the validity as a function of the counted number of observances and counted number of violations, wherein the likelihood of validity indicates a relative likelihood that a related code instance is required to observe the correctness rule; and outputting the code instances in order of the likelihood of validity of a violated correctness rule.

19. The article of manufacture of claim 18, wherein the electronically readable medium is further configured with instructions for causing a processor, in determining a likelihood of validity, to perform the step comprising determining a likelihood of the validity of each code instance as a function of an expected ratio of observances to violations, the counted number of observances, and the counted number of violations.

20. The article of manufacture of claim 19, wherein the electronically readable medium is further configured with instructions for causing a processor, in determining a likelihood of validity, to perform the step comprising statistically ranking each code instance according to a number of standard deviations away, a ratio of the counted number of observances to the counted number of violations is from the expected ratio.

21. The article of manufacture of claim 20, wherein the electronically readable medium is further configured with instructions for causing a processor, in statistically ranking each code instance, to perform the step comprising determining a z statistic for proportions.

22. The article of manufacture of claim 18, wherein a first correctness rule specifies that a variable must be protected by a lock before accessing the variable, and the electronically readable medium is further configured with instructions for causing a processor to perform the steps comprising:

in counting an observance of the first correctness rule by a particular code instance, identifying program code that locks a particular first variable followed by program code that accesses a particular second variable; and in counting a violation of the first correctness rule by the particular code instance, identifying program code that accesses the particular second variable where no preceding program code locks the particular first variable.

23. The article of manufacture of claim 18, wherein a first correctness rule specifies that invocation of a first function must not follow an invocation of a second function in the program code, and the electronically readable medium is further configured with instructions for causing a processor to perform the steps comprising:

in counting an observance of the first correctness rule by a particular code instance, identifying program code that includes a sequence of instructions that includes invocation of a particular second instruction and no previous invocation of a particular first function; and in counting a violation of the first correctness rule by the particular code instance, identifying program code that includes a sequence of instructions in which an invocation of a particular first function is present following invocation of a particular second instruction.

24. The article of manufacture of claim 18, wherein a first correctness rule specifies that invocation of a first function must follow an invocation of a second function in the program code, and the electronically readable medium is further configured with instructions for causing a processor to perform the steps comprising:
- in counting an observance of the first correctness rule by a particular code instance, identifying program code that includes a sequence of instructions that includes an invocation of a particular first function following invocation of a particular second instruction; and
- in counting a violation of the first correctness rule by the particular code instance, identifying program code that includes a sequence of instructions that includes an invocation of the particular second instruction without a previous invocation of the particular first function.

25. The article of manufacture of claim 18, wherein a first correctness rule specifies that data returned from a first function must be tested for a status indication, and the electronically readable medium is further configured with instructions for causing a processor to perform the steps comprising:
- in counting an observance of the first correctness rule by a particular code instance, identifying program code that includes a sequence of instructions that includes an invocation of a particular first function and a subsequent test of data returned from the particular first function; and
- in counting a violation of the first correctness rule by the particular code instance, identifying program code that includes a sequence of instructions that includes an invocation of a particular first function without a subsequent test of data returned from the particular first function.

* * * * *

UNITED STATES PATENT AND TRADEMARK OFFICE
CERTIFICATE OF CORRECTION

| | | |
|---|---|---|
| PATENT NO. | : 7,505,952 B1 | Page 1 of 1 |
| APPLICATION NO. | : 10/689556 | |
| DATED | : March 17, 2009 | |
| INVENTOR(S) | : Engler et al. | |

It is certified that error appears in the above-identified patent and that said Letters Patent is hereby corrected as shown below:

In The Specification Under Column 1:

• Please replace lines 4-11 with:

--FEDERALLY SPONSORED RESEARCH OR DEVELOPMENT
This invention was made with Government support under contracts 0086160 awarded by the National Science Foundation, F29601-01-2-0085 awarded by the Department of the Air Force, MDA904-98-C-A933 awarded by Defense Advanced Research Projects Agency and by NAS1-98139 awarded by NASA. The Government has certain rights in this invention.--

Signed and Sealed this
Nineteenth Day of April, 2011

David J. Kappos
*Director of the United States Patent and Trademark Office*